UNITED STATES PATENT OFFICE.

MOSE R. ISAACS, OF PHILADELPHIA, PENNSYLVANIA.

METHOD OF TREATING ALBUMINOIDS AND THE COMPOSITION OF MATTER PRODUCED THEREFROM.

No. 879,007.

Specification of Letters Patent.

Patented Feb. 25, 1908.

Application filed January 3, 1907. Serial No. 350,610.

*To all whom it may concern:*

Be it known that I, MOSE R. ISAACS, citizen of the United States, and residing at the city and county of Philadelphia, State of Pennsylvania, have invented certain new and useful Improvements in Methods of Treating Albuminoids and the Composition of Matter Produced Therefrom, of which the following is a full, clear, and exact description.

My invention relates to the treatment of albuminoids and to the glue and sizings and compositions of matter made of proteids produced therefrom, and especially to those made from casein; and my invention relates more specifically to the production of the casein from milk, and the compounds derived therefrom.

The objects of my invention are to produce a casein which may be easily reduced to a solution by the introduction of solvents; which remains stable for a comparatively long time; which, when combined with any suitable liquid or material produces a glue or sizing which is highly waterproof; which is eminently adapted for the sizing or coating of paper, or textile goods, with or without the addition of a mineral base; also for gluing woodwork and for general use in the arts.

In carrying out my invention, I precipitate the casein in milk by adding to warmed milk, skimmed milk or buttermilk a suitable quantity or proportion of hydro-fluo-silicic acid. In practice, I use about five pounds of hydro-fluo-silicic acid to about two thousand pounds of milk, but the proportion of the acid to the milk may be varied considerably from the above stated, the same depending upon the quality of casein required to be produced. The casein, having been precipitated, is separated from the whey in any well known manner; such as by drawing off the liquid whey, and pressing the casein to eject therefrom whatever whey may be retained by the same; and if desired, the casein may be afterwards dried and pulverized. The casein so formed differs considerably from casein produced by other methods with which I am familiar, in several respects; notably in the following particulars, to wit:—This casein goes readily into solution with water and an alkaline substance, and forms a solution that will better hold up the pigment or color that may be mixed therewith, and which is very stable. It also forms a very translucent solution. Also, the glue or sizing formed therefrom, after hardening, is very water-resistant, making it eminently desirable for the sizing and coating of paper, with or without mineral base or filler, and for the making of paints and water colors, which is also largely due to its holding pigments and mineral matter well in suspension when in solution. In addition, the waterproof qualities of the glue formed therefrom render it very desirable for general uses in the arts, such as for joining woodwork, &c. Also, the casein precipitated by hydro-fluo-silicic acid keeps much better than casein produced by the ordinary well known methods. I have also found that the casein precipitated by hydro-fluo-silicic acid readily dissolves, and mixes with Portland cement, in connection with any of the usual substances for rendering casein soluble, such as lime, or other alkaline substance.

As an example of a solution that may be formed from the casein precipitated by hydrofluosilicic acid, as above described: I would take one hundred parts, (by weight) of the precipitated and dried casein, thirteen parts of lime, two parts of Portland cement, and four to five hundred parts of water; which when mixed together will form a gelatinous solution suitable for use in the arts. I have also found hydrofluosilicic acid to be useful in precipitating other proteids from their solutions, particularly the proteids contained in blood.

Having thus described my invention, I claim as new, and desire to secure by Letters Patent:

1. The method of preparing a proteid which consists in precipitating the same from a solution by hydro-fluo-silicic acid.

2. The method of preparing a proteid which consists in precipitating the curd from milk by hydro-fluo-silicic acid.

3. The method of precipitating casein from milk which consists in adding to the milk substantially one half of one percent. of hydro-fluo-silicic acid.

4. The method of producing a glue or sizing which consists in precipitating the casein from milk by adding hydro-fluo-silicic acid thereto, separating the casein from the whey, then adding to said separated casein an alkaline substance.

5. The method of forming glue or sizing consisting in precipitating casein by hydrofluosilicic acid, separating the casein from the whey, and adding an alkaline substance and water to said casein.

6. A composition of matter formed by combining a proteid and hydrofluosilicic acid.

7. A composition of matter formed by combining casein and hydrofluosilicic acid.

8. A composition of matter consisting of casein precipitated by hydro-fluo-silicic acid, and an alkaline substance.

9. A composition of matter consisting of casein precipitated by hydro-fluo-silicic acid, Portland cement, and an alkaline substance.

In testimony whereof, I have hereunto affixed my signature.

MONE R. ISAACS.

Witnesses:
A. V. GROUPE,
E. M. WARE.